Figure 1:
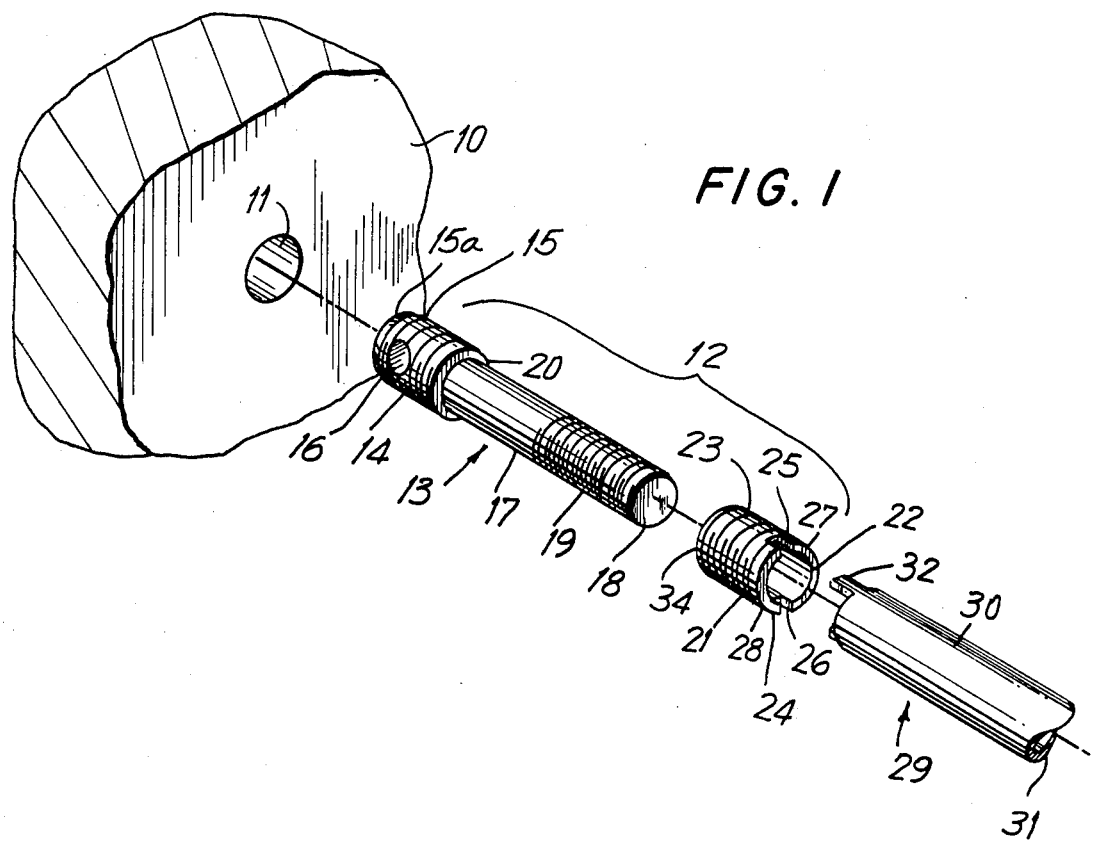

United States Patent [19]
Bosse

[11] 3,889,352
[45] June 17, 1975

[54] METHOD OF MOUNTING LOCKING, SELF-TAPPING THREADED STUD INSERT ASSEMBLY

[75] Inventor: Robert W. Bosse, Englewood Cliffs, N.J.

[73] Assignee: Groov-Pin Corporation, Ridgefield, N.J.

[22] Filed: Oct. 17, 1974

[21] Appl. No.: 515,656

Related U.S. Application Data
[62] Division of Ser. No. 336,872, Feb. 28, 1973.

[52] U.S. Cl. .................. 29/432; 29/523; 29/525
[51] Int. Cl. ........................................... B23p 11/00
[58] Field of Search ....... 29/432, 432.1, 432.2, 523, 29/525, 526; 85/1 SS, 42, 47; 151/14, 15, 70, 41.73, 41.7; 403/343, 361

[56] References Cited
UNITED STATES PATENTS

| | | | |
|---|---|---|---|
| 2,728,370 | 12/1955 | Neuschotz | 151/41.73 |
| 2,782,883 | 2/1957 | Rosan | 29/432 UX |
| 2,783,811 | 3/1957 | Cummaro | 29/525 UX |
| 2,823,574 | 2/1958 | Rosan | 85/47 |
| 3,289,725 | 12/1966 | Gehring | 29/525 X |
| 3,297,071 | 1/1967 | Neuschotz et al. | 29/432 X |
| 3,319,690 | 5/1967 | Rosan et al. | 29/432 X |
| 3,430,531 | 3/1969 | Bosse | 85/47 |

Primary Examiner—C. W. Lanham
Assistant Examiner—Victor A. DiPalma
Attorney, Agent, or Firm—Arthur B. Colvin

[57] ABSTRACT

A self-tapping stud assembly is provided, including a positive locking ring, the stud assembly being adapted to be driven into a cylindrical opening formed in a workpiece, and securely but removably locked to the workpiece by an externally threaded sleeve which is threadable into the tapped opening.

2 Claims, 2 Drawing Figures

PATENTED JUN 17 1975 3,889,352

3,889,352

METHOD OF MOUNTING LOCKING, SELF-TAPPING THREADED STUD INSERT ASSEMBLY

This application is a division of copending Application Ser. No. 336,872, filed Feb. 28, 1973.

This invention is in the field of self-tapping threaded studs. More particularly, the invention is directed to an improved threaded stud assembly having increased resistance to withdrawal within the aperture tapped thereby, yet permitting easy removal of the stud should the same be required. The stud is further characterized by the ability to be driven into position with reduced torque, as compared to studs heretofore known, without sacrifice of holding strength.

It is known to provide a stud member adapted to be inserted into a cylindrical opening formed in a workpiece, the stud member including at one end a self-tapping head or lead portion and at the other end a threaded holding portion. The stud is applied by gripping the holding portion and forcibly rotating the stud with the lead portion engaged against the entrance of the opening in the workpiece, which must of course be of softer material than that of the stud. Through the application of substantial torque, a thread is cut in the opening and the stud progressively advanced into the interior of the opening so that a desired length of the shank having the retaining thread projects beyond the opening. The use of such self-tapping studs is widespread in the industry. By way of example, it is conventional to drill or otherwise form openings in engine blocks and drive studs into the openings, the threaded projecting portions of the studs being employed as the means for maintaining exhaust manifolds or like parts in position against the engine block.

In many applications, particularly where the stud will be subjected to repetitive cycles of heating and cooling, vibration and the like, studs have become unthreaded from their tapped-in position by virtue of rotation under the noted influences. To avoid such unthreading, it is conventional after insertion of a stud, to deform the metal at the junction of the stud and opening to prevent possible rotation. While such method is effective to a degree, in the event of fracture of the stud or stripping of the threads on the holding portion of the stud, the metal deformation precludes or renders difficult the subsequent removal of the stud and reinsertion of a new stud.

In addition, where the stud is subjected to considerable tension longitudinal to its axis, to avoid pull out, the head portion would be elongated requiring a high degree of torque for its insertion.

SUMMARY OF THE INVENTION

The present invention may be summarized as directed to an improved threaded stud assembly and method of inserting the same. The threaded stud includes an enlarged inner end or head portion having an external self-tapping thread of known design. The stud includes a reduced diameter cylindrical shank portion, an annular shoulder being formed at the junction of the inner end and remainder of the shank portion.

A tubular sleeve is provided with an internal bore which may be slid over the projecting portion of the stud, the inner diameter of the sleeve and the outer diameter of the projecting portion of the stud preferably providing minimal clearance therebetween. The sleeve is provided at its external surface with a helical thread adapted to be introduced into the thread tapped in the opening by insertion of the stud.

The sleeve includes outwardly directed, longitudinally extending drive slots in its outwardly facing end. The sleeve is rotated by a driving tool of cylindrical nature which surrounds the exposed portion of the stud, the tool including one or more teeth entering the drive slots of the sleeve. Rotation of the tool advances the sleeve so that its lead end engages against the annular shoulder separating the self-tapping portion of the stud and the smaller diameter shank portion.

Optionally but preferably, the sleeve is of softer material than the stud, the application of continued torque, after engagement of the sleeve with the annular shoulder, being effective slightly to deform the material of the sleeve adjacent the drive slots, to induce a frictional wedging action. Notwithstanding the slight deformation, should the stud fracture or the threads be stripped on the holding portion thereof, the sleeve may be removed and the stud may similarly be removed by reversely rotating the noted parts.

It is accordingly an object of the present invention to provide an improved threaded stud assembly having locking means which resist inadvertent removal or rotation of the stud but permit removal, should the same be desired.

It is a further object of the invention to provide a stud assembly of the type described and method of employing the same.

It is still a further object of the invention to provide a stud of the type described which may be driven into position through the application of less torque than required for the application of studs of comparable holding power heretofore known.

Figure 2:
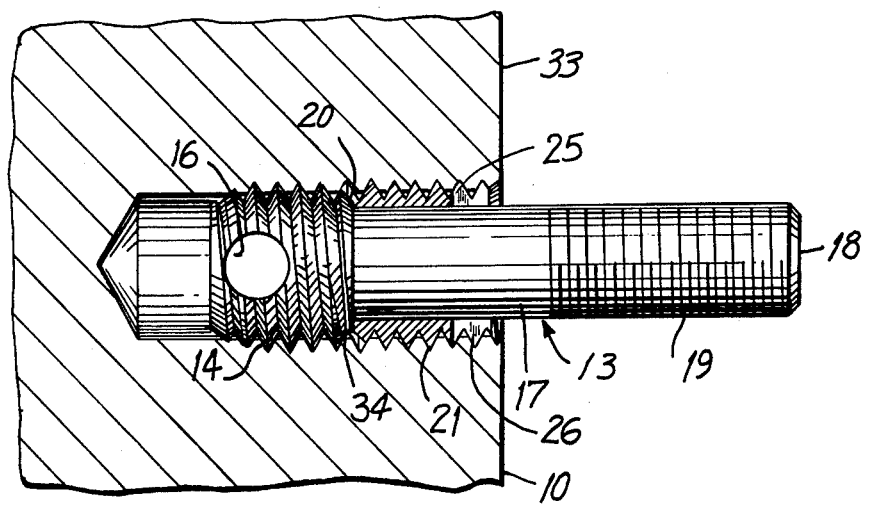

To attain these objects and such further objects as may appear herein or be hereinafter pointed out, reference is made to the accompanying drawings, forming a part hereof, in which:

FIG. 1 is an exploded perspective view of the opening in a workpiece to which the stud is applied, the stud, the holding sleeve, and the driving tool for the sleeve, and FIG. 2 is a magnified sectional view of an applied stud and sleeve.

Referring now to the drawings, there is shown in FIG. 1 a workpiece 10 having formed therein a cylindrical opening 11 to which the stud assembly 12 is to be applied.

The stud assembly includes an elongated shank 13 having an enlarged cylindrical inner end portion 14, which enlarged portion is provided with a self-tapping thread assembly 15. As details of the self-tapping component are well known, a protracted description thereof need not be made, it being understood that the thread 15 may be constructed in accordance with U.S. Pat. No. 3,430,531.

Additionally, the cutting portion of the stud may include a transverse opening 16 to augment the cutting action and reduce the possibility of fracture, as well as to define a receptacle for metal wastes and shavings formed in the course of cutting.

The stud 13 includes a reduced cylindrical shank portion 17, threaded from its outer end 18 inwardly, as by helical thread 19. An abutment shoulder 20 is defined at the junction of the enlarged center portion 14 and reduced shank portion 17.

Locking sleeve 21 comprises a tubular member having an internal bore 22 of a diameter intimately to slide over the reduced shank portion 17. The sleeve 21 includes an external helical thread 23 cut to fit a female thread tapped by the cutting threads 15 of the enlarged inner end portion 14 of the stud. At the rear end 24 of the sleeve there are formed a pair of inwardly extending, longitudinally directed drive slots 25, 26, defining opposed drive tabs or wings 27, 28.

There is shown at 29 a drive tool for positioning the sleeve 21 into locking engagement within the opening. The drive tool includes a tubular shank 30, formed with an internal bore 31, of a size to fit over the narrow shank portion 17 of the stud 13. The tool 29 includes a pair of forwardly extending driver fingers 32, dimensioned to fit in the slots 25, 26 of the sleeve 21.

The mounting of the stud in opening 11 is effected as follows:

The reduced shank portion 17 is gripped by a chuck or like tool, which may or may not engage the shank by being threaded over the portion 19. The lead end 15a of the tapping portion 14 is pressed against the entrance of the opening 11 and the stud caused to rotate while also applying axial forces. In known manner the portion 14 taps a thread 33 into the wall of the opening 11, and at the same time the stud is advanced into applied position within the opening. When the stud reaches a selected depth within the opening, the driving tool is removed and the sleeve 21 is shifted over the shank portion 17, the threads 23 on the outer face of the sleeve being threadedly engaged with the threads 33 cut in the wall defining the opening 11.

The tool 29 is sleeved over the shank portion 17, the drive fingers or teeth 32 entering into slots 25, 26, whereby continued torque may be applied to the sleeve. The sleeve, by rotation of the tool 29, is progressively threaded inwardly into the opening 11 until the lead end 34 of the sleeve engages the annular abutment 20 on the stud.

It will be apparent that when the parts are in the engaging position described, further torque on the tool 29 will be ineffective to induce further rotation of the sleeve.

From the foregoing it will be apparent that, by reason of the locking engagement of the sleeve against the abutment shoulder 20, accidental or inadvertent rotation of the stud 13 within the tapped aperture formed in the opening 11 is prevented.

It will be further apparent that the holding forces retaining the stud in position within the opening are the cumulative forces of the stud per se and the sleeve since outward movement of the stud, by reason of the engagement of the stud and sleeve, would be possible only if the threads between the stud and opening and the thread engagement between the sleeve and opening are both stripped.

The described arrangement has the additional advantage that, by reducing the longitudinal extent of the threaded portion of the lead end of the stud, frictional drag and, hence, the torque required to insert the stud, is reduced, as contrasted with a stud not incorporating a locking sleeve wherein an extended threaded length is mandatory to achieve comparable holding strength.

The additional frictional drag required by a stud employing an extended length threaded connection inheres in the fact that, notwithstanding the transverse aperture 16, detritus collects in the thread whereby the torque required to drive the stud into position involves a cumulative cutting torque and a threading torque, which threading torque is higher than might normally be expected, due to the presence of detritus.

In accordance with the instant invention, it is possible and desirable to remove the detritus in advance of application of the locking sleeve, as by blowing out the opening, whereby the sleeve may be driven without application of substantial torque and yet is effective to increase the resistance to stripping.

Optionally but preferably, the metal of the sleeve may be of softer constitution than that of the stud. Where such relatively soft sleeve is employed, the sleeve may be driven into position until the inner end 34 abuts shoulder 20. At this point an additional distorting torque may be applied which deforms the driving tabs or wings 27 or 28 adjacent the slots 25, 26, providing an augmented frictional connection between the sleeve and the opening.

Should it be desired to remove the stud or a fragment thereof, it is merely necessary to unthread the sleeve, as by counter-rotation of the tool 29, and grip the stud, counter-rotating it to release it from the opening 11.

From the foregoing it will be evident that there is provided an improved self-tapping stud assembly having increased resistance to unthreading in use, without the necessity of permanently deforming the metal of the stud or the aperture containing the stud.

The stud may be driven through the use of a reduced, torque as compared with a stud having a comparable length of engaging threads to the combined thread length of the sleeve and stud, due to the fact that the two part construction of the instant invention permits removal of detritus before application of the sleeve and due to the further fact that it is difficult to rotate a self-tapping stud having an extended length of threaded shank.

Having thus described my invention, what I claim as new and desire to secure by Letters Patent of the United States is:

1. The method of mounting a self-tapping threaded stud assembly in a cylindrical opening formed in a material relatively softer than the material of said stud, said stud including an enlarged cylindrical inner end including a tapping thread and a reduced diameter shank including a holding thread, said enlarged and reduced portions being separated by an annular shoulder, and a tubular locking sleeve having an internal bore slidable over said reduced diameter portion of said stud, the external circumference of said sleeve being threaded to match the threading of said tapping thread, said sleeve, in addition, including drive means at the trailing end thereof, which comprises the steps of forcibly rotating said shank while said threaded inner end is engaged in said opening, thereby to thread said inner end into said opening and tap a thread in said opening, sliding said sleeve over said threaded-in stud, thereafter rotating said sleeve by torque applied to said drive means to cause said external thread portion of said sleeve to enter the threads tapped by said inner end of said stud, and continuing to rotate said sleeve until the lead end portion thereof engages tightly against said annular shoulder of said stud.

2. The method of claim 1 in which the drive means includes a drive slot and including the additional step of continuing to apply torque to said sleeve through said drive slot, thereby to distort said sleeve portions surrounding said slot into frictional engagement with said opening and shank.

* * * * *